(12) United States Patent
Yao

(10) Patent No.: US 7,796,894 B1
(45) Date of Patent: Sep. 14, 2010

(54) REDUCTION OF NOISE AND POLARIZATION MODE DISPERSION (PMD) BASED ON OPTICAL POLARIZATION STABILIZER IN FIBER TRANSMISSION

(75) Inventor: X. Steve Yao, Diamond Bar, CA (US)

(73) Assignee: General Photonics Corporation, Chino, CA (US)

(\*) Notice: Subject to any disclaimer, the term of this patent is extended or adjusted under 35 U.S.C. 154(b) by 483 days.

(21) Appl. No.: 10/903,240

(22) Filed: Jul. 30, 2004

Related U.S. Application Data

(60) Provisional application No. 60/491,620, filed on Jul. 30, 2003.

(51) Int. Cl.
*H04B 10/00* (2006.01)
(52) U.S. Cl. .................. 398/159; 398/152
(58) Field of Classification Search .......... 398/147, 398/148, 149, 150, 152, 158, 159, 160, 161, 398/26
See application file for complete search history.

(56) References Cited

U.S. PATENT DOCUMENTS

| | | | |
|---|---|---|---|
| 3,302,028 A | 1/1967 | Sterzer | |
| 3,684,350 A | 8/1972 | Wentz | |
| 3,719,414 A | 3/1973 | Wentz | |
| 4,389,090 A | 6/1983 | LeFevre | |
| 4,461,543 A | 7/1984 | McMahon | |
| 4,798,436 A | 1/1989 | Mortimore | |
| 5,004,312 A | 4/1991 | Shimizu | |
| 5,111,322 A | 5/1992 | Bergano et al. | |
| 5,153,676 A | 10/1992 | Bergh | |
| 5,251,057 A | 10/1993 | Guerin et al. | |
| 5,317,445 A | 5/1994 | DeJule et al. | |
| 5,373,393 A | 12/1994 | DeJule et al. | |
| 5,381,250 A | 1/1995 | Meadows | |
| 5,473,457 A * | 12/1995 | Ono | 398/185 |
| 5,475,525 A | 12/1995 | Tournois et al. | |
| 5,561,726 A | 10/1996 | Yao | |
| 5,611,005 A | 3/1997 | Heismann et al. | |

(Continued)

OTHER PUBLICATIONS

U.S. Appl. No. 10/800,406 entitled "Monitoring Mechanisms for Optical Systems" filed by Yao on Mar. 12, 2004.

Azzam, R.M.A., "Photopolarimeter using two modulated optical rotators", *Optics Letters*, 1(5):181-183, Nov. 1977.

(Continued)

*Primary Examiner*—Nathan M Curs
(74) *Attorney, Agent, or Firm*—Fish & Richardson P.C.

(57) ABSTRACT

This application describes devices and techniques for dynamically controlling polarization light at one or more locations along the optical transmission path to reduce optical noise and PMD in the optical signal. One device according to an implementation includes a polarization controller to receive an optical signal and operable to control polarization of the optical signal in response to a control signal, a fixed optical polarizer to receive output from the optical polarization controller and to produce an output optical signal, and a circuit to receive a fraction of the output optical signal from the fixed optical polarizer and operable to produce the control signal in response to an output power level of the output optical signal which controls the polarization controller to maximize the output power level.

7 Claims, 5 Drawing Sheets

U.S. PATENT DOCUMENTS

| | | | |
|---|---|---|---|
| 5,723,856 A | 3/1998 | Yao et al. |
| 5,751,747 A | 5/1998 | Lutes et al. |
| 5,777,778 A | 7/1998 | Yao |
| 5,796,510 A | 8/1998 | Yao |
| 5,835,270 A | 11/1998 | Urino et al. |
| 5,917,179 A | 6/1999 | Yao |
| 5,929,430 A | 7/1999 | Yao et al. |
| 5,930,414 A | 7/1999 | Fishman et al. |
| 5,978,125 A | 11/1999 | Yao |
| 6,178,036 B1 | 1/2001 | Yao |
| 6,181,728 B1 | 1/2001 | Cordingley et al. |
| 6,229,937 B1 | 5/2001 | Nolan et al. |
| 6,252,711 B1 | 6/2001 | Damask et al. |
| 6,339,489 B1* | 1/2002 | Bruyere et al. ............ 398/147 |
| 6,377,719 B1 | 4/2002 | Damask |
| 6,389,197 B1 | 5/2002 | Ilchenko et al. |
| 6,417,948 B1 | 7/2002 | Chowdhury et al. |
| 6,417,957 B1 | 7/2002 | Yao |
| 6,473,218 B1 | 10/2002 | Maleki et al. |
| 6,476,959 B2 | 11/2002 | Yao |
| 6,480,637 B1 | 11/2002 | Yao |
| 6,487,233 B2 | 11/2002 | Maleki et al. |
| 6,487,336 B1 | 11/2002 | Yao |
| 6,488,861 B2 | 12/2002 | Iltchenko et al. |
| 6,493,116 B1* | 12/2002 | Robinson et al. ............ 398/20 |
| 6,493,474 B1 | 12/2002 | Yao |
| 6,498,869 B1 | 12/2002 | Yao |
| 6,535,328 B2 | 3/2003 | Yao |
| 6,542,650 B2 | 4/2003 | Khosravani et al. |
| 6,546,159 B1 | 4/2003 | Peng et al. |
| 6,552,833 B2 | 4/2003 | Liu et al. |
| 6,567,167 B1 | 5/2003 | Chou et al. |
| 6,567,436 B1 | 5/2003 | Yao et al. |
| 6,576,886 B1 | 6/2003 | Yao |
| 6,577,445 B1 | 6/2003 | Damask |
| 6,580,532 B1 | 6/2003 | Yao et al. |
| 6,594,061 B2 | 7/2003 | Huang et al. |
| 6,604,871 B2* | 8/2003 | Cao ............................ 398/158 |
| 6,628,850 B1 | 9/2003 | Yao |
| 6,628,861 B1 | 9/2003 | Yao |
| 6,628,862 B1 | 9/2003 | Yao |
| 6,643,064 B2 | 11/2003 | Huang et al. |
| 6,661,941 B1 | 12/2003 | Yao |
| 6,671,464 B1* | 12/2003 | Kikuchi ...................... 398/65 |
| 6,687,423 B1 | 2/2004 | Yao |
| 6,707,977 B2 | 3/2004 | Chien et al. |
| 6,731,389 B2 | 5/2004 | Luscombe et al. |
| 6,754,404 B2 | 6/2004 | Yao |
| 6,795,481 B2 | 9/2004 | Maleki et al. |
| 6,795,616 B2 | 9/2004 | Yao |
| 6,836,327 B1 | 12/2004 | Yao |
| 6,842,283 B2 | 1/2005 | Savory et al. |
| 6,847,484 B2 | 1/2005 | Damask et al. |
| 6,867,918 B2 | 3/2005 | Damask |
| 6,873,631 B2 | 3/2005 | Yao et al. |
| 6,873,783 B1 | 3/2005 | Yao |
| RE38,735 E | 5/2005 | Yao |
| 6,891,616 B2 | 5/2005 | Saitoh et al. |
| 6,891,674 B2 | 5/2005 | Damask |
| 6,900,932 B2 | 5/2005 | Chen et al. |
| 6,937,798 B1 | 8/2005 | Yao et al. |
| RE38,809 E | 10/2005 | Yao |
| 6,975,454 B1 | 12/2005 | Yan et al. |
| 7,027,135 B2 | 4/2006 | Fu et al. |
| 7,027,198 B2 | 4/2006 | Yao |
| 7,067,795 B1 | 6/2006 | Yan et al. |
| 7,068,896 B1 | 6/2006 | Kath et al. |
| 7,076,169 B2* | 7/2006 | Shpantzer et al. ............ 398/76 |
| 7,154,659 B1 | 12/2006 | Yao et al. |
| 7,157,687 B1 | 1/2007 | Yao |
| 7,218,436 B2 | 5/2007 | Yao |
| 7,227,686 B1 | 6/2007 | Yan et al. |
| 7,233,720 B2 | 6/2007 | Yao |
| 7,265,836 B1 | 9/2007 | Yao |
| 7,265,837 B1 | 9/2007 | Yao |
| 7,343,100 B2 | 3/2008 | Yao |
| 7,372,568 B1 | 5/2008 | Yao |
| 7,382,962 B1 | 6/2008 | Yao |
| 7,391,977 B2 | 6/2008 | Yao |
| 7,436,569 B2 | 10/2008 | Yao et al. |
| 7,466,471 B2 | 12/2008 | Yao |
| 7,522,785 B2 | 4/2009 | Yao |
| 2001/0052981 A1 | 12/2001 | Chung et al. |
| 2002/0015547 A1 | 2/2002 | Patel |
| 2002/0075477 A1 | 6/2002 | Yu et al. |
| 2002/0191265 A1* | 12/2002 | LaGasse et al. ............ 359/246 |
| 2003/0007151 A1 | 1/2003 | Eckert |
| 2003/0035120 A1 | 2/2003 | Myatt et al. |
| 2003/0076588 A1 | 4/2003 | Savory et al. |
| 2003/0081874 A1 | 5/2003 | Yao |
| 2003/0156776 A1 | 8/2003 | Han et al. |
| 2003/0206689 A1 | 11/2003 | Jung et al. |
| 2004/0037495 A1 | 2/2004 | Yao |
| 2004/0247226 A1 | 12/2004 | Pyo et al. |
| 2005/0041922 A1 | 2/2005 | Yao |
| 2005/0129346 A1 | 6/2005 | Chen et al. |
| 2005/0168659 A1 | 8/2005 | Melton |
| 2005/0200941 A1 | 9/2005 | Yao |
| 2005/0201751 A1 | 9/2005 | Yao |
| 2005/0265728 A1 | 12/2005 | Yao |
| 2006/0023987 A1 | 2/2006 | Yao |
| 2006/0115199 A1 | 6/2006 | Yao |
| 2007/0223078 A1 | 9/2007 | Yao et al. |
| 2007/0297054 A1 | 12/2007 | Yao et al. |
| 2008/0030839 A1 | 2/2008 | Yao |
| 2008/0054160 A1 | 3/2008 | Yao |
| 2008/0138070 A1 | 6/2008 | Yan et al. |
| 2008/0159692 A1 | 7/2008 | Yao |
| 2009/0028565 A1 | 1/2009 | Yao |

OTHER PUBLICATIONS

Chipman, R.A., *Handbook of Optics*, vol. II, Chapter 22—Polarimetry, 2nd Ed. M. Bass ed., McGraw-Hill, New York, 1995.

Collett, E., *Polarized Light in Fiber Optics*, Chapters 15-16, The PolaWave Group, New Jersey, 2003.

Compain, E., et al., "General and Self-Consistent Method for the Calibration of Polarization Modulators, Polarimeters, and Mueller-Matrix Ellipsometers", *Applied Optics*, 38(16):3490-3502, Jun. 1999.

De Martino, A., et al., "Optimized Mueller polarimeter with liquid crystals", *Optics Letters*, 28(8):616-618, Apr. 2003.

Goldstein, D.H., et al., "Error analysis of a Mueller matrix polarimeter", *J. Opt. Soc. Am. A*, 7(4):693-700, Apr. 1990.

Goldstein, D.H., *Polarized Light*, Chapter 29, 2nd Ed., Marcel Dekker, New York, 2003.

Khosravani R. et al., "Time and Frequency Domain Characteristics of Polarization-Mode Dispersion Emulators," *IEEE Photonics Technology Letters*, 13(2):127-129, Feb. 2001.

Rochford, K.B., et al., "Accurate Interferometric Retardance Measurements," *Applied Optics*, 36(25):6473-6479, Sep. 1997.

Sobiski, D., et al., "Fast first-order PMD compensation with low insertion loss for 10Gbit/s system," *Electronics Letters*, 37(1):46-48, Jan. 2001.

Wang, S.X., et al., "Fast wavelength-parallel polarimeter for broadband optical networks", *Optics Letters*, 29(9):923-925, May 2004.

Williams, P., "Rotating-Polarizer Polarimeter for Accurate Retardance Measurement," *Applied Optics*, 36(25):6466-6472, Sep. 1997.

Williams, P., "Rotating-Wave-Plate Stokes Polarimeter for Differential Group Delay Measurements of Polarization-Mode Dispersion", *Applied Optics*, 38(31):6508-6515, Nov. 1999.

Yan, L.-S., et al., "Experimental Importance Sampling Using a 3-Section PMD Emulator with Programmable DGD Elements," *Optical Fiber Communications Conference (OFC 2003)*, paper ThA4, 4 pages, Mar. 2003.

Yan, L.-S., et al., "High-Speed and Highly Repeatable Polarization-State Analyzer for 40-Gb/s System Performance Monitoring," *IEEE Photonics Technology Letters*, 18(4):643-645, Feb. 2006.

Yan, L.-S., et al., "High-Speed, Stable and Repeatable PMD Emulator with Tunable Statistics," *Optical Fiber Communication Conference (OFC 2003)*, paper MF6, 5 pages, Mar. 2003.

Yao, X. S., et al., "Highly repeatable all-solid-state polarization-state generator", *Optics Letters*, 30(11):1324-1326, Jun. 2005.

\* cited by examiner

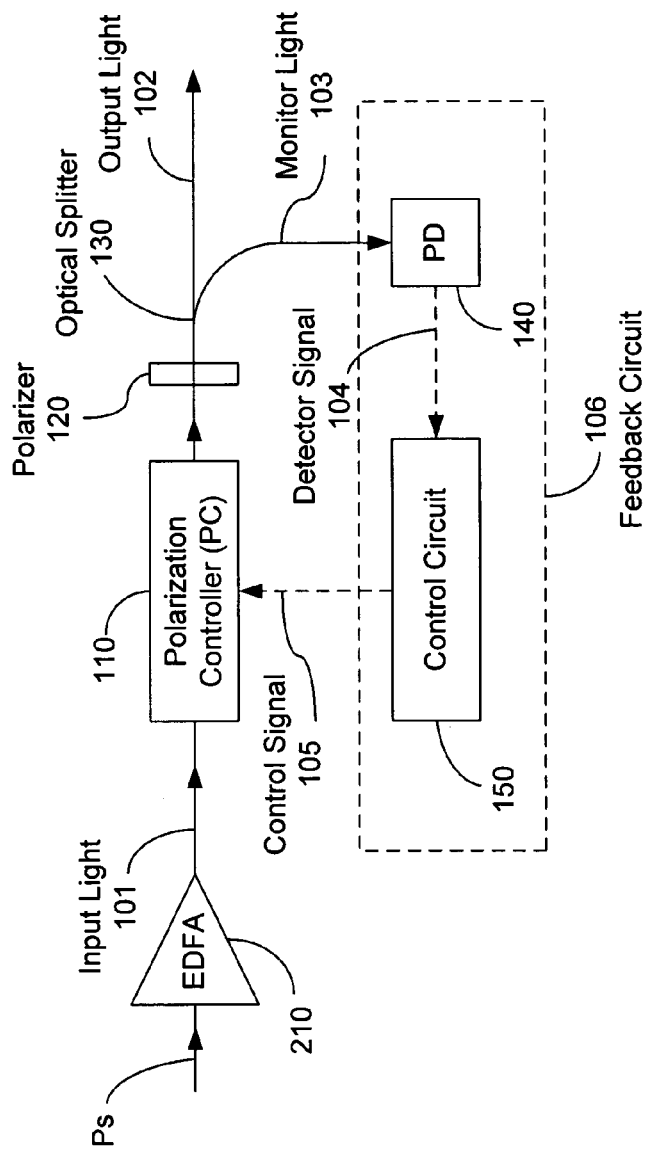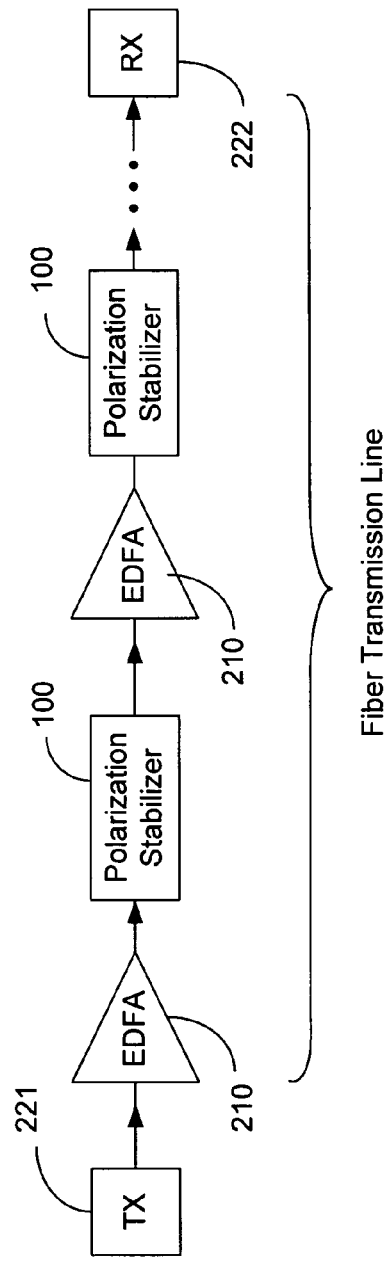
FIG. 2A
FIG. 2B

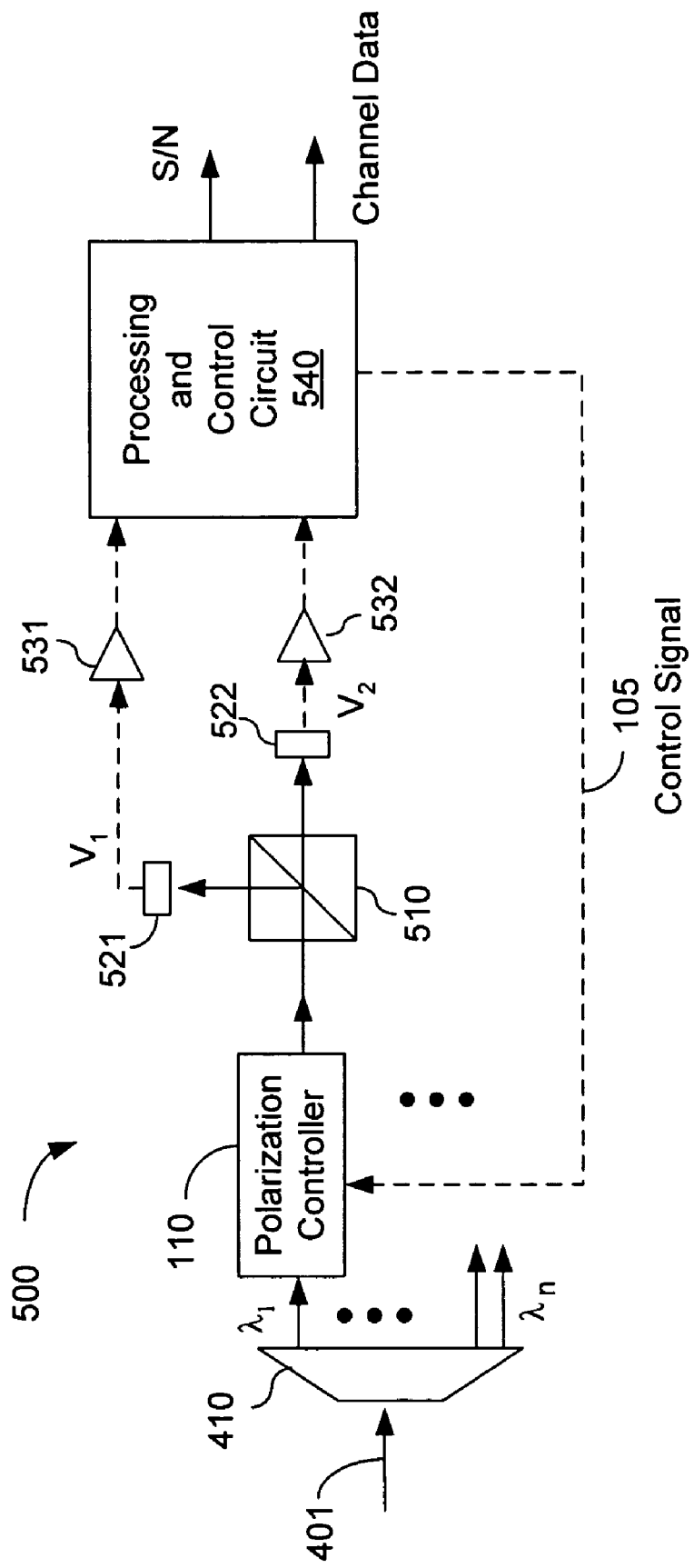

REDUCTION OF NOISE AND POLARIZATION MODE DISPERSION (PMD) BASED ON OPTICAL POLARIZATION STABILIZER IN FIBER TRANSMISSION

This application claims the benefit of U.S. Provisional Patent Application No. 60/491,620 entitled "REDUCTION OF NOISE AND PMD BASED ON OPTICAL POLARIZATION STABILIZER IN FIBER TRANSMISSION" and filed Jul. 30, 2003, the entire disclosure of which is incorporated herein by reference as part of the specification of this application.

BACKGROUND

This application relates to effects of polarization of light in optical devices and systems.

Polarization of light is an important property of light in various applications. Many optical transmission media, such as optical fibers, exhibit one or more polarization-related effects that alter the light based on the optical polarization of light. Examples of such effects include polarization mode dispersion (PMD) and polarization dependent loss (PDL) and others. Optical polarization of light in such optical transmission media may be controlled to achieve desired operating effects.

SUMMARY

This application describes devices and techniques for dynamically controlling polarization light at one or more locations along the optical transmission path to reduce optical noise and PMD in the optical signal. In one implementation, each location where the polarization is controlled, a polarization stabilizer may be used to include a polarization controller (PC) as the input and a fixed optical polarizer as the output. An optical coupler may be used to split a fraction of the output as a feedback to measure the output power of the stabilizer. A control circuit, in response to the measured output power, may be used to control and adjust the PC to maintain the output of the fixed polarizer at a maximum power. Optical noise, generally unpolarized, can be reduced by one half upon transmission through the fixed polarizer at each location. When one or more optical amplifiers (such as Er-doped fiber optical amplifier) are present in the optical path, the amplified spontaneous emission (ASE) from each optical amplifier can be reduced by 50% at each location. The polarization controller, the polarizer and the control circuit also operate in combination to re-align the polarization of light to reduce the portion of the signal that is affected by the PMD and thus reduces the impact of the PMD on the signal.

The above polarization controller, the polarizer and the control circuit may also be used to measure the signal to noise ratio of an optical signal, e.g., in a WDM system and other applications.

These and other implementations, features and their variations are described in greater detail in the attached drawings, the detailed description, and the claims.

BRIEF DESCRIPTION OF DRAWINGS

FIGS. 2A and 2B show two exemplary applications of the polarization stabilizer in FIG. 1.

FIGS. 5A and 5B show two exemplary applications using a modified version of the polarization stabilizer in FIG. 1 to reduce the noise and PMD and to monitor the signal to noise ratio.

DETAILED DESCRIPTION

Figure 1:
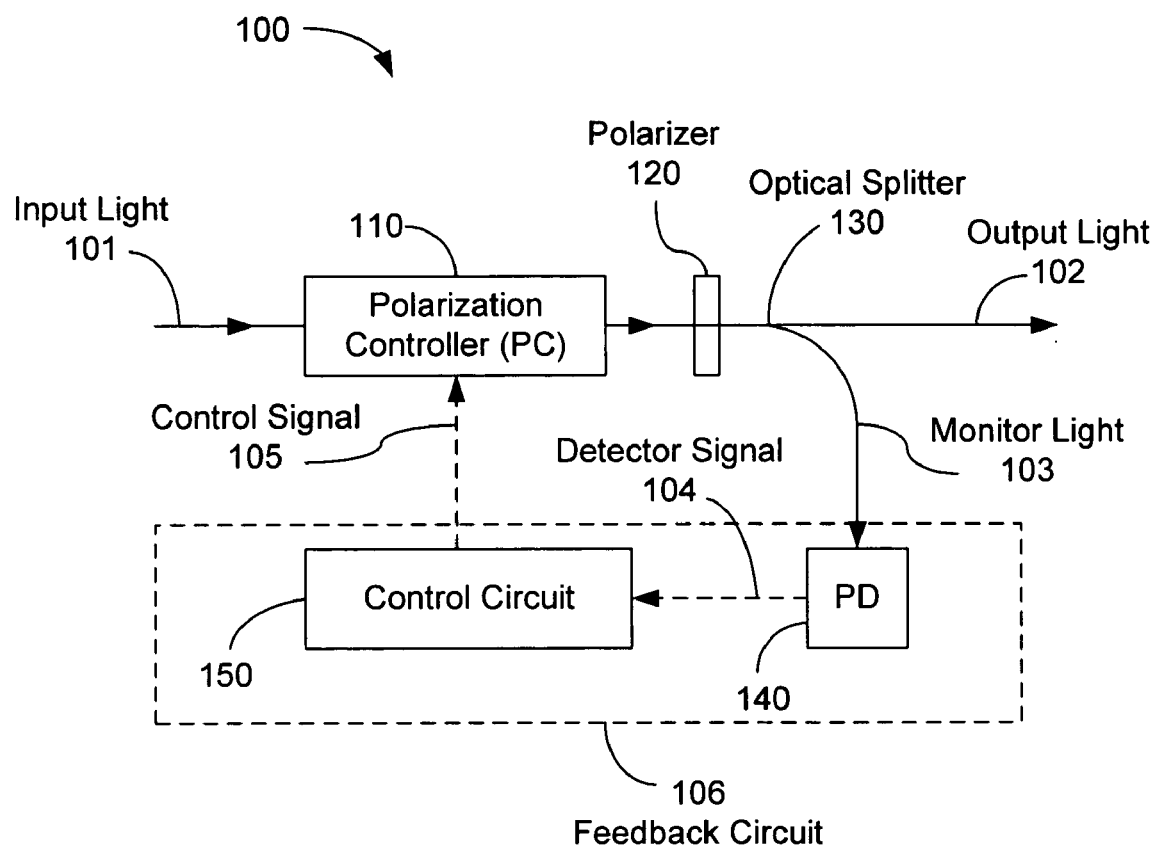
FIG. 1 shows an example of a polarization stabilizer with a dynamic feedback control for reducing noise and PMD in an optical signal.

FIG. 1 illustrates a polarization stabilizer 100 in one exemplary implementation for controlling polarization of input light 101 in a fiber transmission line or another optical transmission medium. The polarization stabilizer 100 is used to select only the polarization with the maximum amplitude at its output light 102 to go on and reject light in other polarization states.

In the example illustrated, the polarization stabilizer 100 includes a polarization controller 110 at the input, a fixed optical polarizer 120 at the output and a feedback circuit 106 that controls the polarization controller 110 in response to the output of the polarizer 120. The polarization controller 110 may be designed to convert the polarization of received light into a desired polarization on the Poincare sphere to maximize the output power at the polarizer 120. The polarization controller 110 may be implemented in various configurations. For example, multi-element designs based on piezo-electric elements, electro-ceramic elements, liquid crystal elements, solid state electro-optic elements (e.g., lithium niobate crystals) may be used to have three or more adjustable polarization elements in series to form a polarization controller. Accordingly, the feedback circuit 106 produces a control signal 105 with multiple element control signals that respectively control the polarization elements. As a specific example, U.S. Pat. No. 6,493,474 issued to Yao on Dec. 10, 2002 discloses devices based on four sequential fiber squeezers which can operate as the polarization controller 110. The disclosure of U.S. Pat. No. 6,493,474 is incorporated herein by reference in its entirety as part of the specification of this application.

In the polarization stabilizer 100, an optical splitter 130 may be implemented at the output of the polarizer 120 to split a fraction of the output from the polarizer 120 as monitor light 103 for controlling the polarization controller 110. The majority of the output of the polarizer 120 continues to propagate along the optical path as the output light 102. The feedback circuit 106 includes a photodetector (PD) 140 for converting the monitor light 103 into an electrical detector signal 104, and a control circuit 150 that responds to the detector signal 104 to generate the control signal 105 to the polarization controller 110. In operation, the control circuit 150 monitors the power level received by the photodetector 140 and adjusts the polarization controller 110 via the control signal 105 to maximize the received power level at the photodetector 140, i.e., maintain the output of the fixed polarizer 120 at a maximum power. The control circuit 150 operates in a dynamic way to adjust the polarization controller 110 as the optical power at the output of the polarizer 120 changes, in part due to time-varying effects of the transmission media and other optical elements in then optical path of the light prior to the polarization stabilizer 100.

In the above polarization stabilizer 100, the polarizer 120 is fixed in its polarization direction and hence the polarization controller 110 operates to control the input polarization of the input light 101 into a linear polarization along the polarization direction of the polarizer 120. For unpolarized noise, such as ASE nose in one or more optical amplifiers located in the optical path prior to the polarization stabilizer 100, the polarizer 120 cuts the power of such noise by 50% at the output of the polarizer 120. The optical signal, however, is mostly preserved by the operation of the polarization controller 110 and the control circuit 150 in response to the monitor light 103. As a result, the noise figure of the optical signal 102 after passing through the polarization stabilizer 100 is improved in comparison with the noise figure of the input light 101.

The noise figure of a signal can be expressed as NF as follows:

$$NF = 10 \log\left(1 + \frac{\text{Noise Power}(P_N)}{\text{Signal Power}(P_S)}\right)$$
$$= 10 \log(1 + R)$$

where R is defined as the ratio of $P_N/P_S$. After passing the polarization stabilizer 100, the signal power remains essentially unchanged and the noise power is reduced by one half. Hence, the noise figure for the output light 102 of the polarization stabilizer 100 is $$NF_1 = 10 \log(1 + R/2)$$
$$= 10 \log\left(1 + 10^{\frac{NF}{10}}\right) - 3.$$

Hence, if the noise figure in the signal 101 is 5 dB prior to entry of the polarization stabilizer 100, the new noise figure in the signal 102 is 3.2 dB. As another example, if the noise figure in the signal 101 is 4 dB prior to entry of the polarization stabilizer 100, the new noise figure in the signal 102 is 2.5 dB. Therefore, the operation of the polarization stabilizer 100 reduces the noise in the optical signal.

FIG. 2A shows that the polarization stabilizer 100 may be placed at the output of an optical amplifier 210 to reduce the noise, especially the ASE noise generated in the amplifier 210. FIG. 2B further shows that a fiber transmission line with a plurality of in-line optical amplifiers 210 for the optical signals, such as Er-doped fiber amplifiers (EDFAs), between an optical transmitter (TX) 221 and an optical receiver (RX) 222 may implement the polarization stabilizer 100 at the output of each amplifier 210. At the output of each optical amplifier, a polarization stabilizer is connected in the fiber line to select only the polarization with the maximum amplitude to go on to the next amplifier.

In addition to the above described reduction of noise, the polarization stabilizer 100 also reduces the effect of the polarization-dependent dispersion (PMD) in the fiber line on the optical signal. Since the polarization controller 110 dynamically projects the input polarization of the optical signal to the linear polarization of the fixed polarizer 120, a fraction of each optical pulse that has a polarization deviated from the original signal polarization is filtered out by the polarizer 120 and thus is dropped by the polarization stabilizer. This fraction is only a small fraction of each pulse and the majority of the pulse passes through the polarization stabilizer 100. Hence, the information of each pulse is preserved.

Figure 3:
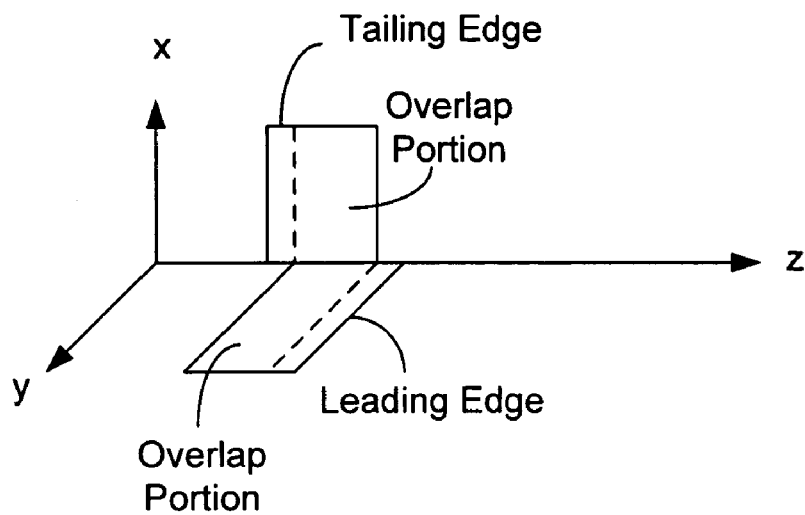
FIG. 3 illustrates the operation of the polarization stabilizer in FIG. 1 for reducing the PMD in an optical signal.

FIG. 3 illustrates the operation of the polarization stabilizer 100 in reducing the PMD. Assume a pulse propagates along the optical path in the z direction and is decompose into x-polarized component and y-polarized component. When the optical path exhibits PMD, the x-polarized component travels slower than the y-polarized component. As such, the two polarization components of a pulse will shift relative to each other in space and time. As illustrated, the y-polarized component will have a leading edge that does not overlap with the x-polarized component and an overlap portion that overlaps with an overlap portion in the x-polarized component. The x-polarized component will also have a tailing edge that does not overlap with the y-polarized component.

Assuming the PMD effect is small, the overlapped portions in the x-polarized and y-polarized components constitute the majority of the optical pulse and thus are coherent to each other. The overlapped portions in the x-polarized and y-polarized components coherently superpose to form the original pulse signal that is essentially not affected by the PMD in the fiber line and may be generally elliptically polarized. The polarization stabilizer 100 controls the polarization controller 110 to project the polarization of this superposition of the overlapped portions in the x-polarized and y-polarized components to be in the linear polarization of the polarizer 120 to pass therethrough. The tailing edge in the x polarization and the leading edge in the y polarization are separated from the overlapped portions due to the PMD and are transformed by the polarization controller 110 into polarizations that are not the linear polarization of the polarizer 120. Hence, the polarizer 120 rejects at least part of each of the trailing and leading edges created by the PMD. As a result, the PDM effect is reduced in the output light 102 of the polarization stabilizer 100 in comparison with that in the input light 101. In this regard, the polarization stabilizer 100 in an effect uses the polarization controller 110 to realign the polarization of the signal to reduce the PMD in the signal. In presence of two or more polarization stabilizers as shown in FIG. 2B, the PMD is reduced each time when the signal passes through a polarization stabilizer.

Figure 4:
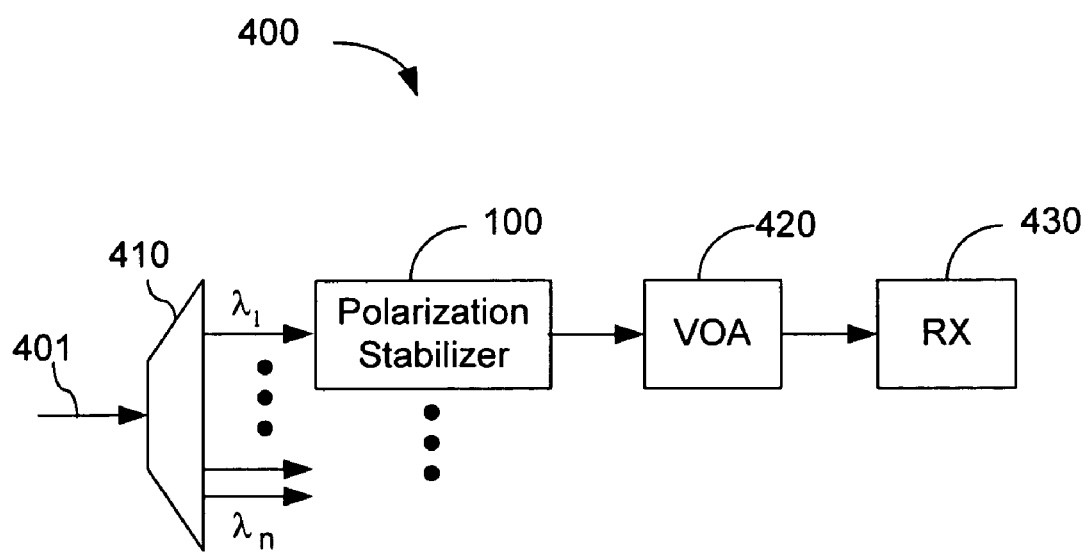
FIG. 4 shows an application of the polarization stabilizer in FIG. 1 in connection with an optical receiver in a WDM system.

FIG. 4 shows one exemplary application of the polarization stabilizer 100 in wavelength-division-multiplexing (WDM) communication. A WDM signal 401 is used to carry multiple WDM channels at different WDM wavelengths $\lambda 1, \lambda 2, \ldots, \lambda n$. A WDM demultiplexer 410 is used to separate different WDM channels into different optical paths. Each WDM channel is then directed into a polarization polarizer 100 as described in FIG. 1 and a downstream variable optical attenuator (VOA) 420 to reduce the noise and the PMD in that WDM channel. After processing by the polarization stabilizer 100 and the VOA 420, an optical receiver (RX) 430 is used to receive and detect the WDM channel. The VOA 420 may be used to adjust the power level of each channel.

In the polarization stabilizer 100, the fixed polarizer 120 may be replaced by a polarization beam splitter (PBS) to perform the same function as the polarizer 120 and to add an additional function of reflecting light in polarization orthogonal to the polarizer to a second, different detector so that the signal to noise ratio (SNR) of the received optical signal can also be monitored at the same time while the noise and PMD are reduced. The technique for monitoring the signal to noise ration is described in a co-pending U.S. Utility patent application Ser. No. 10/800,406 entitled "MONITORING MECHANISMS FOR OPTICAL SYSTEMS" filed by Yao on Mar. 12, 2004, the entire disclosure of which is incorporated herein by reference as part of the specification of this application.

FIG. 5A shows one implementation of this SNR monitoring based on the polarization stabilizer 100 in FIG. 1 in a WDM receiver 500. A PBS 510 is used to replace the fixed polarizer 120 in FIG. 1. A photodetector 532 is used to receive the transmission of the PBS 510 which is maximized by the polarization controller 110 under the control of the control signal 105 from a processing and control circuit 540. The detector output V2 from the detector 522 is used for both producing the detector signal 104 to an equivalent control circuit 150 built in the circuit 540 for generating the control signal 105 to the PC 110 and detecting the channel data in the WDM channel signal received by the polarization controller 110 from the WDM demux 410. The PBS 510 also reflects light in an orthogonal polarization to a second detector 521 which produces a detector signal V1. One half of the unpolarized noise in the input signal is reflected into the second detector 521. Based on the outputs V1 and V2, the signal to noise ratio of the signal can be measured and monitored based on the technique described in the above referenced U.S. application Ser. No. 10/800,406.

More specifically, the SNR can be expressed as follows:

$$SNR = \frac{P_S}{P_N}$$

$$V_2 = (1-\delta)P_S + \frac{1}{2}P_N,$$

$$V_1 = \delta P_S + \frac{1}{2}P_N,$$

where δ is the depolarization factor caused by, e.g., the PMD in the input signal, the nonlinear birefringence, and imperfection of the PBS 510. Based on the above, the SNR is given by:

$$SNR = \frac{P_S}{P_N} = \frac{V_2 - V_1}{2V_1\left(1-\frac{\delta}{2}\right) - \delta V_2} = \frac{V_2 - V_1}{2V_1} \text{ when } \delta = 0.$$

Therefore, the modified polarization stabilizer can achieve three functions: reducing noise in the signal, reducing PMD in the signal, and measuring SNR in the signal. This application can certainly be used other than WDM receiver.

Figure 5B:
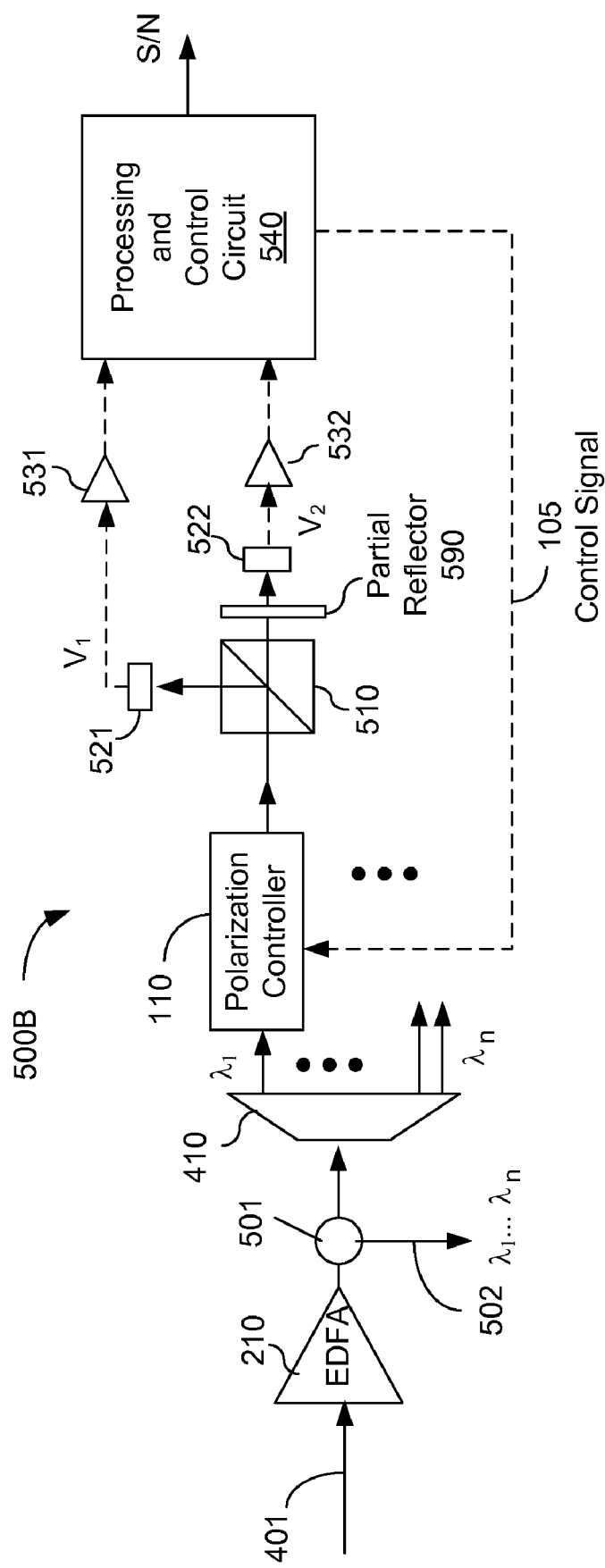

FIG. 5B shows a WDM system 500B where the above modified polarization stabilizer is used to recondition the WDM channels by reducing the noise and the PMD and to monitor the SNR. The reconditioned WDM channels are then redirected by using a partial reflector 590 in an optical path of each channel between the PBS 510 and the detector 522 and an optical circulator 501 located at the input of the WDM demux 410. The partial reflector 590 is designed to transmit only a small fraction of the WDM channel into the detector 522, e.g., less than 5% of the signal and reflects the majority of the signal back to the PBS to the WDM demux 410 which combines the reflected channel with other reflected channels and direct the reflected and reconditioned WDM channels to the optical circulator 510 to output as WDM channels 502.

Only a few examples and applications are described and other variations and enhancements are possible based on the teaching of this application.

What is claimed is the devices, systems, and techniques as described and illustrated, including:

1. An optical wavelength division multiplexing (WDM) communication system, comprising:
a fiber transmission line that receives a plurality of WDM optical signals at different WDM wavelengths;
an optical circulator having a first port coupled to the fiber transmission line to receive the WDM optical signals, a second port to output the received WDM optical signals and a third port to output light received at the second port;
a WDM demultiplexer coupled to the second port of the optical circulator to separate WDM optical signals output by the second port into separated WDM optical signals along different optical paths; and
a plurality of optical conditioning modules respectively coupled in the different optical paths, each optical conditioning module reconditioning a respective WDM optical signal and direct the reconditioned WDM optical signal back to the WDM demultiplexer which combines reconditioned WDM optical signals from the separate optical paths into the second port of the optical circulator which outputs the reconditioned WDM optical signals at the third port,
each optical conditioning module comprising:
a polarization controller coupled in a respective optical path for a respective WDM optical signal to control polarization of the WDM optical signal in response to a control signal;
a polarization beam splitter placed in the optical path downstream from the polarization controller to transmit light in a first polarization in the WDM optical signal as a first optical signal and to reflect light in a second polarization orthogonal to the first polarization in the WDM optical signal as a second optical signal;
a first optical detector to receive at least a portion of light of the first optical signal to produce a first detector signal;
a second optical detector to receive at least a portion of light of the second optical signal to produce a second detector signal;
a partial reflector located in one an optical path between the polarization beam splitter and one of the first and second optical detectors to reflect light back to the polarization beam splitter which directs the reflected light from the partial reflector to pass through the polarization controller to the WDM demultiplexer as a reconditioned WDM optical signal; and
a control circuit coupled to receive the first and second detector signals to produce the control signal to the polarization controller based on the received first and second detector signals to reduce noise and polarization mode dispersion in the reconditioned WDM optical signal.

2. The system as in claim 1, wherein the polarization controller comprises a plurality of adjustable polarization elements.

3. The system as in claim 2, wherein the adjustable polarization elements comprise piezo-electric elements.

4. The system as in claim 2, wherein the adjustable polarization elements comprise electro-ceramic elements.

5. The system as in claim 2, wherein the adjustable polarization elements comprise liquid crystal elements.

6. The system as in claim 2, wherein the adjustable polarization elements comprise solid state electro-optic elements.

7. The system as in claim 6, wherein the solid state electro-optic elements include lithium niobate crystals.

* * * * *

UNITED STATES PATENT AND TRADEMARK OFFICE
CERTIFICATE OF CORRECTION

PATENT NO. : 7,796,894 B1  
APPLICATION NO. : 10/903240  
DATED : September 14, 2010  
INVENTOR(S) : X. Steve Yao Page 1 of 1

It is certified that error appears in the above-identified patent and that said Letters Patent is hereby corrected as shown below:

In Column 1, Line 61, please delete "OF DRAWINGS" and insert -- OF THE DRAWINGS --, therefor.

In Column 4, Line 40, please delete "λ1, λ2,...," and insert -- $\lambda_1, \lambda_2,...,$ --, therefor.

In Column 5, Line 4, please delete "V2" and insert -- $V_2$ --, therefor.

In Column 5, Line 11, please delete "V1." and insert -- $V_1$. --, therefor.

In Column 5, Line 13, please delete "V1 and V2," and insert -- $V_1$ and $V_2$, --, therefor.

Signed and Sealed this  
Twenty-sixth Day of April, 2011

David J. Kappos  
*Director of the United States Patent and Trademark Office*